United States Patent [19]
Bromberg

[11] Patent Number: 6,052,694
[45] Date of Patent: Apr. 18, 2000

[54] METHOD AND APPARATUS FOR LOGGING DATABASE PERFORMANCE CHARACTERISTICS

[75] Inventor: Richard N. Bromberg, Denver, Colo.

[73] Assignee: Electronic Data Systems Corporation, Plano, Tex.

[21] Appl. No.: 09/044,105

[22] Filed: Mar. 18, 1998

[51] Int. Cl.$^7$ .................................................. G06F 17/30
[52] U.S. Cl. .................................. 707/200; 707/2; 714/1
[58] Field of Search ........................... 707/1–2, 200–203, 707/10, 3.1; 395/701–704; 714/1

[56] References Cited

U.S. PATENT DOCUMENTS 5,701,471 12/1997 Subramanyam ........................ 707/200
5,819,066 10/1998 Bromberg et al. ........................ 714/11

OTHER PUBLICATIONS

"Benchmarking Multilevel Secure Databse Systems Using the Mitre Benchmark," Doshi et al., Proceedings of the 10th Annual Conference on Computer Security Applications, IEEE, pp. 86–95, Dec. 1994.

*Primary Examiner*—Hosain T. Alam
*Attorney, Agent, or Firm*—L. Joy Griebenow; Baker & Botts L.L.P.

[57] ABSTRACT

The invention comprises a system and method for monitoring and logging performance characteristics of a database (18). According to one aspect of the invention, a method of monitoring and logging the performance of a database (18) comprises initiating a database performance monitoring session, repeatedly obtaining selected performance data comprising at least one performance value comprising a measure of the performance of the database (18), and logging the performance data to a storage medium (20) operable to facilitate subsequent retrieval of a subset (222) of the selected performance values for analysis.

28 Claims, 2 Drawing Sheets

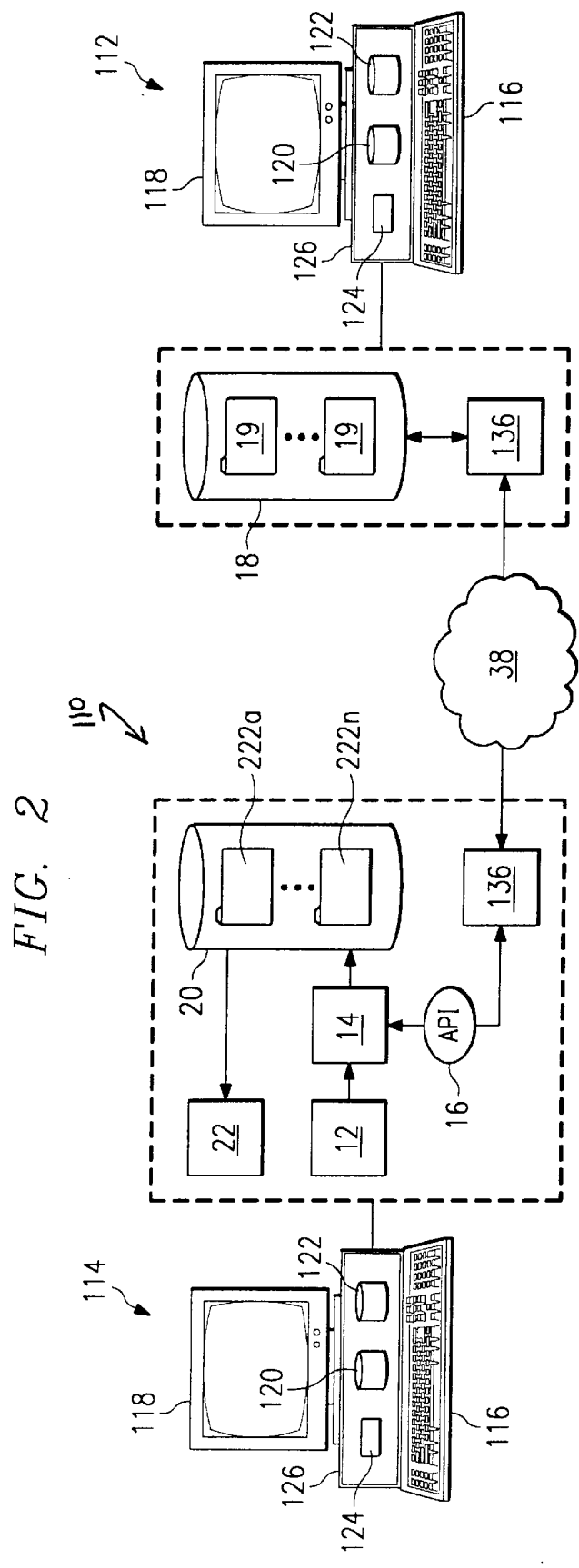

ns technical field of the invention
METHOD AND APPARATUS FOR LOGGING DATABASE PERFORMANCE CHARACTERISTICS

TECHNICAL FIELD OF THE INVENTION

This invention relates generally to computer performance monitoring systems, and more particularly to a system and method for monitoring and logging performance characteristics of a database.

BACKGROUND OF THE INVENTION

Data warehousing is an emerging industry presently experiencing explosive growth. Data warehousing involves storing substantial amounts of client data in large databases, which must facilitate manipulation, modification, and analysis of client data. To ensure adequate performance, these databases should preferably be performance tuned both initially, and on an ongoing basis.

One approach to performance tuning a database is to constantly monitor particular performance characteristics, or metrics associated with the operation of the database. This approach typically involves real-time visual presentation of a limited number of performance metrics. The goal of this approach is to present visual data to an analyst in hopes that the analyst will note any deficiencies in the performance of the database during his or her observation. This approach was originally developed and used with relatively small databases as compared to the large data warehouses described above. A problem with this approach is that typical queries that may take seconds or sub-seconds to execute on smaller databases, take minutes or hours to execute on the large data warehouses. Real-time visual inspection, thus, is an inappropriate method of evaluating the performance of data warehouses.

Another approach to performance tuning a database is to record the real-time performance metrics and play them back at a later time. A problem with this approach is that these systems are generally proprietary, prohibiting access to the raw data collected. They merely play back the recorded real-time information at a later time. These systems, therefore, suffer from the same shortcomings as systems that merely display real-time values of performance metrics. In addition, these systems typically implement a menu driven system, which limits the choice of observable metrics and combinations thereof.

SUMMARY OF THE INVENTION

In accordance with one aspect of the present invention, a method of monitoring and logging the performance of a database comprises initiating a database performance monitoring session, repeatedly obtaining selected performance data comprising at least one performance value comprising a measure of the performance of the database, and logging the performance data to a storage medium operable to facilitate subsequent retrieval of a subset of the selected performance values for analysis.

Technical advantages of the present invention include the provision of a system and method for monitoring and logging the performance of a database to facilitate subsequent analysis of all or a subset of the selected performance data. Logging performance data at specified intervals and for specified durations facilitates subsequent longitudinal analysis of trends in database performance. This capability is particularly important in performance tuning large data warehouses.

The invention allows complete customization of the performance data, or combinations of performance data sought to be logged by facilitating logging of selected database performance metrics, and tailoring a test duration and sample period for each variable logged. In addition, the invention may minimize processing overhead on a database by driving all measurements from a single query script, facilitating execution of multiple queries through a single call. The individual queries of the query script may be modifiable and interchangeable, further adding to the flexibility of the system.

The initiating module and query script may be run on a server computer with the database residing on a client computer. Executing the initiating module and query script on a separate server computer provides an advantage of minimizing interference with the performance of the database. Furthermore, the database performance monitor and logger may be constructed to operate with numerous different types of databases, regardless of the platform supporting the database or the query script.

BRIEF DESCRIPTION OF THE DRAWINGS

For a more complete understanding of the present invention, and for further features and advantages thereof, reference is now made to the following description taken in conjunction with the accompanying drawings, in which:

FIG. 2 illustrates one possible environment for a database performance logger constructed in accordance with the teachings of the present invention;

DETAILED DESCRIPTION OF THE INVENTION

Figure 1:
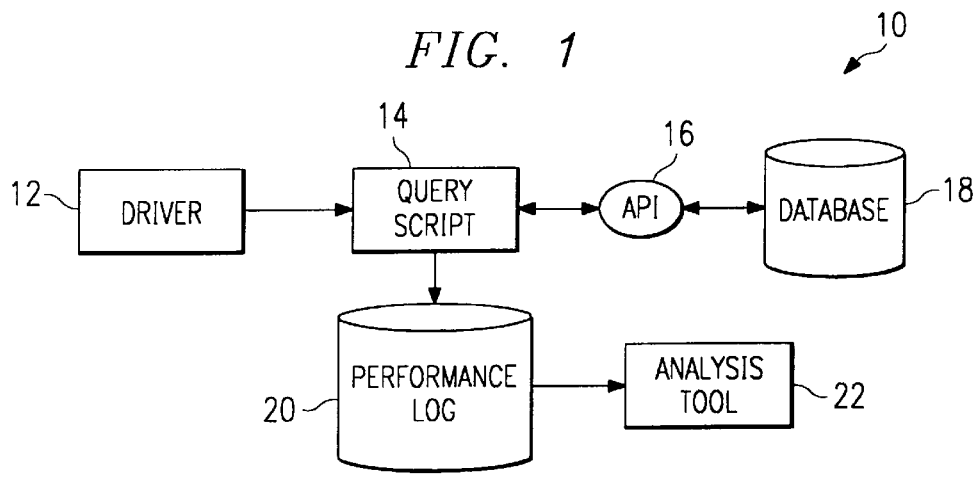
FIG. 1 illustrates a database performance logger constructed in accordance with the teachings of the present invention.

FIG. 1 is a block diagram of an exemplary database performance logger 10. Database performance logger 10 comprises an initiating module 12 coupled to a query script 14. As used in this document, the terms "module" and "script" refer to a set of instructions, procedures, and/or functions and related data adapted for implementation in a suitable computer language such as C, C++, Java, or any other appropriate development language. Also, the term "coupled" generally indicates direct or indirect communication between two or more elements. Items said to be "coupled" to one another may, but need not be directly connected. In the illustrated embodiment, initiating module 12 and query script 14 comprise separate functional elements. These, and other functional elements could, alternatively, be combined to form a single multi-function module.

Query script 14 interfaces with a database 18 through an application program interface 16. Database 18 may comprise any data structure or arrangement, or combination of data structures and arrangements operable to store and facilitate retrieval of various data. For example, database 28 may comprise an Oracle-based or an Informix-based data warehouse. Application program interface 16 may comprise any set of instructions, procedures, and/or functions and related data operable to facilitate communication between query script 14 and database 18. Application program interface 16 may be designed to facilitate communication between query script 14 and database 18 independent of the platform supporting each element.

Query script 14 also communicates with a performance log 20. Performance log 20 may comprise any data structure or arrangement, or combination of data structures and arrangements operable to facilitate storage and retrieval of various data. One or more analysis tools 22 may access performance log 20 to retrieve and analyze all or a subset of the stored data. Analysis tools 22 may comprise any functional element operable to sort, arrange, graph, illustrate, calculate, or otherwise analyze data stored in performance log 20. Analysis tool 22 may comprise, for example a spread sheet program.

Although the structure and operation of database performance logger 1o will be described in detail below, a brief overview of the operation of system 10 will now be given. Initiating module 12 operates to initiate a performance logging session by, for example, automatically executing at a specified time or executing in response to user input from a command line. Initiating module 12 instructs query script 14 to execute one or more queries on database 18. In one embodiment, database 18 may track various performance data, or metrics. In that case, query script 14 accesses database 18 and retrieves performance values related to selected metrics. In another embodiment (not explicitly shown), performance logger 10 may further comprise a monitoring sub-module operable to monitor various characteristics of database 18, and facilitate retrieval of performance values associated with those characteristics by query script 14. Query script 14 passes retrieved performance values to performance log 20, where each performance value is tagged and stored in a performance log file (e.g. FIG. 4). Analysis tool 22 may later access performance log 20 and retrieve all, or a subset of the selected performance data for analysis.

FIG. 2 illustrates one possible environment in which the present invention may operate. A database performance logger 110 may execute with any of the well-known MS-DOS, PC-DOS, OS-2, MAC-OS, WINDOWS™, UNIX, or other appropriate operating systems on one or more computers. In the illustrated embodiment, database performance logger 110 resides on a first computer 112, and monitors a database 18 residing on a second computer 114. Database performance logger 110 may monitor databases residing on any number of computers. Additionally, database performance logger 110 and the monitored database may reside on the same computer.

Each computer 112 and 114 includes an input device 116, an output device 118, random access memory (RAM) 120, read-only memory (ROM) 122, CD-ROM, hard drive, or other magnetic or optical storage media 124, or other appropriate storage and retrieval devices, and a processor 126. Input device 116 may comprise, for example, a keyboard, mouse, graphics tablet, joystick, light pen, microphone, scanner, or other suitable input device. Output device 118 may comprise, for example, a video display, a printer, a disk drive, a plotter, a speaker, or other suitable output device.

First computer 112 and second computer 114 may communicate using communication interfaces 136 coupled to a network 38. Network 38 may comprise any suitable wireline or wireless system operable to facilitate communication between communication interfaces 136. For example, network 38 may comprise a public switched telephone network (PSTN), an integrated services digital network (ISDN), a local area network (LAN), a wide area network (WAN), a global computer network such as the Internet or other dedicated switched network, or other communication system at one or more locations. Each interface 136 may include appropriate hardware (e.g. modem, network interface card, etc.) and software, including protocol conversion and data processing capabilities, to communicate using a direct connection to a PSTN or ISDN, a connection through a LAN, WAN, or global computer network such as the Internet, or any other suitable communication connection that allows computers 112 and 114 to communicate using network 38.

In the illustrated embodiment, database 18 resides within the memory of first computer 112. Database 18 may be stored, for example, within RAM 120, ROM 122, or disk drive 124 of first computer 112. Database 18 stores various client data and facilitates addition, modification and retrieval of such data. In addition, database 18 may track various metrics, or performance values associated with database 18. For example, in this embodiment, database 18 comprises an Oracle-based database, which includes dynamic performance tables 19. Dynamic performance tables 19 track a variety of database performance metrics, such as the number of users currently accessing it, the number of read and write operations for each file stored therein, input/output statistics including a calculated buffer cache hit ratio, and a myriad of other variables associated with the structure and operation of database 18. Database 18 may store performance data in American Standard Code for Information Interchange (ASCII) delimited format. This facilitates compatibility and convenient analysis using a variety of analysis tools 22 without first having to convert the format of the performance data.

Figure 3:
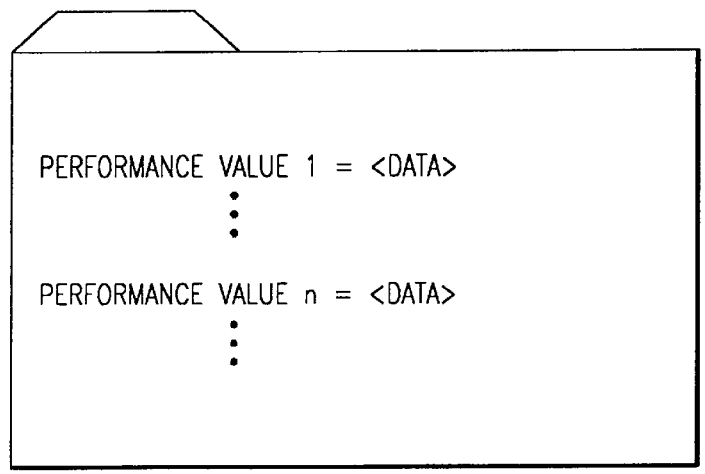
FIG. 3 illustrates a portion of the contents of a database according to the teachings of the present invention.

FIG. 3 illustrates an exemplary dynamic performance table 19. The illustrated embodiment shows performance data stored in a table form. Any data structure, arrangement, or combination of data structures and arrangements may be used to store performance data without departing from the intended scope of the invention. Dynamic performance table 19 tracks data associated with various performance values and is periodically updated by a database management system, such as, for example, an Oracle database management system. By accessing dynamic performance table 19 at defined intervals, performance metrics associated with database 18 may be sampled over a period of time and stored; thus facilitating subsequent analysis of various aspects of the performance of database 18, including performance trends occurring over time.

Referring again to FIG. 2, in the illustrated embodiment, initiating module 12, query script 14, application program interface 16, and performance log 20 reside on second computer 114. Second computer 114 may comprise, for example, a server computer operable to access a plurality of client computers 112 over network 38. Executing initiating module 12 and query script 14 on a server computer provides an advantage of facilitating logging of database performance metrics without hindering or otherwise affecting the performance of the database.

In this embodiment, analysis tool 22 also resides on second computer 114. Alternatively, analysis tool 22 could reside on first computer 112, or on a third computer (not explicitly shown). Analysis tool 22 may reside anywhere so long as it may access, either directly or indirectly, information contained in performance log 20.

Initiating module 12 may comprise a parameter-driven shell script operable to accept run-time parameters useful in directing various aspects of the query transactions between query script 14 and database 18. Initiating module 12 may accept parameters, such as the time for execution, the number of iterations to be performed, the interval between iterations, and any other parameter useful in defining a session.

In one embodiment, initiating module 12 may comprise a script operable to initiate a session in response to receiving instructions from a command line. In another embodiment, initiating module may comprise a script capable of being submitted through an operating system scheduling module, such as the CRON utility of the UNIX system. In that case, initiating module may automatically initiate a session at a particular time identified by parameters defined within the script. The present invention provides an advantage of facilitating customization of the timing and duration of performance metric logging.

Query script 14 comprises one or more instructions, or queries for accessing database 18 and retrieving data relating to one or more selected database metrics. In the illustrated embodiment, query script 14 comprises a plurality of structured query language (SQL) queries. The present invention provides an advantage of allowing for complete customization of the metrics, or combinations of metrics sought to be logged. In addition, the individual queries of query script 14 are readily modifiable and interchangeable, further adding to the flexibility of the system.

Each SQL query may be submitted to database 18 through a search script (not explicitly shown), such as SQL*Plus, to retrieve performance values relating to a selected database metric. Query script 14 invokes the search script, which executes several SQL queries in a single call, and re-directs the performance values stored in database 18 to performance log 20.

Query script 14 may be constructed to operate with database 18, regardless of the platform supporting query script 14 and database 18. For example, query script 14 may reside on a UNIX-based system, while database 18 may exist on a WINDOWS™-based system. This platform independence provides an advantage of flexibility and broad application. The present invention provides an advantage in facilitating customization of the queries submitted, and detailed specification of the performance values sought. This provides flexibility in gathering selected ones of the plethora of performance metrics monitored in database 18.

Performance log 20 may comprise any data structure or arrangement, or combination of data structures and arrangements operable to facilitate storage and retrieval of various performance values associated with performance metrics of database 18. Performance log 20 comprises a non-proprietary storage medium operable to allow subsequent access by other modules to facilitate retrieval of all or a subset of the performance values stored therein. Throughout this description, the term "non-proprietary" denotes an openly accessible storage medium. Providing a non-proprietary storage medium allows for customized performance monitoring by facilitating selection and retrieval of a particular subset of stored performance values.

Figure 4:
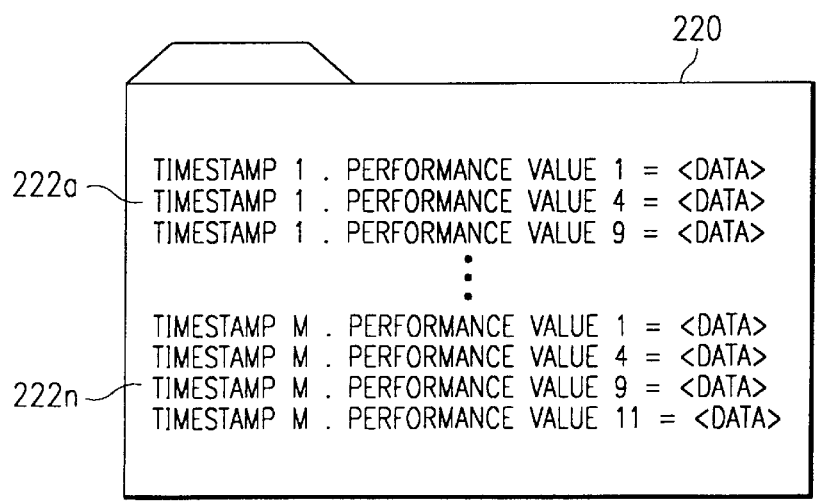
FIG. 4 illustrates an exemplary performance log constructed in accordance with the teachings of the present invention.

FIG. 4 shows an exemplary performance log 20, which includes a plurality of performance log files 222a–222n, referred to generally as performance log files 222. Throughout this description the term "file" refers generally to any arrangement or organization of information that may be generated, accessed, and/or modified by computer 114. Each performance log file 222 comprises performance values associated with selected performance metrics of database 18. In the illustrated embodiment, the performance values stored in dynamic performance tables 19 are in ASCII delimited form. This provides an advantage of facilitating convenient export of all or a subset of the performance values into analysis tool 22 for analysis.

Each performance log file 222 is tagged with a unique identifier. In the illustrated embodiment, each entry is tagged with a time stamp identifying the particular test iteration, and an indication of the name of the performance value measured during that iteration. The current time stamp may be derived, for example, from the system clock. All performance values retrieved during an iteration are tagged with the same time stamp. This facilitates sorting and grouping the performance values for subsequent analysis. The name of the performance value may be derived from the metric name selected by the query, or hard coded into the query. Hard coding the name of the performance value into the query is useful when the queries seek several related database metrics, which are to be combined into a single record.

Performance log 20 may be structured, for example, in a table form to allow sorting and retrieval of the data based on one or more identifiers. For example, analysis tool 22 may access performance log 20 and retrieve data associated with a particular performance value, data associated with a particular iteration (or time stamp), or data associated with a combination of identifiers. In this way, analysis tool 22 may provide a customized analysis of particular performance aspects of database 18 over various time intervals.

Database performance logger 10 may comprise a sub-part of a database performance monitoring system, which includes a benchmark program (not explicitly shown) designed to stress database 18 to simulate various operating scenarios. In that case, database performance logger 10 operates as a companion program to the benchmark testing program, collecting data resulting from the benchmark simulations. In another embodiment, database performance logger 10 may comprise a stand-alone application operable to monitor and log the performance of any database 18. The present invention provides advantages of flexibility, portability and compatibility with numerous types of databases and database testing modules.

In operation, database performance logger 10 initiates a performance logging session, either automatically as defined by parameters within initiating module 12, or in response to requests received from a user at a command line. In any case, query script 14 is instructed to submit SQL queries through a search script to database 18 at specified intervals and for a specified number of iterations. Each SQL query identifies one or more database performance metrics to be monitored and retrieved. The present invention provides an advantage of allowing for customized performance data gathering by particularly specifying database performance metrics of interest and tailoring a test duration and sample period for each metric sought. In addition, the present invention minimizes processing overhead on database 18 by driving all measurements from a single script 14.

Query script 14 accesses database 18, and specifically dynamic performance tables 19, through application program interface 16. Where query script 14 and database 18 reside on separate computers, query script 14 first establishes communications with database 18 over network 38 through interfaces 136. Once communication has been established, either directly through application program interface 16, or indirectly over network 136, query script 14 invokes a search script to submits SQL queries to dynamic performance tables 19 to retrieve specified performance data. The requested data is then communicated to performance log 20, where it is tagged with an identifier and stored in a performance log file 222.

As described above, dynamic performance tables 19 of database 18 store current values of numerous performance metrics. Sampling values of particular performance metrics over time facilitates longitudinal analysis of the performance of database 18, which is difficult, if not impossible by merely making real-time observations of the metrics. For example, query script 14 may comprise queries for sampling access rates of various dictionary caches. Excessive misses on dictionary entries generate recursive calls to reload information from disk, delaying the execution of queries and degrading the overall system performance. Measuring access rates over time may provide insight into the overall behavior of database 18, and help in tuning its performance.

As an additional example, query script 14 may comprise queries seeking data relating to activity on a library cache portion of a shared pool of database 18, such as the total number of executions and reloads, and the reload miss ratio. Measuring the reload statistics over time, and with a varying number of users, can help identify a lack of space in the shared pool resulting in an inability to hold statements in memory.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of monitoring and logging the performance of a database, the method comprising:
   initiating a database performance monitoring session;
   repeatedly obtaining selected performance data comprising at least one performance value comprising a measure of the performance of the database; and
   logging the performance data to a storage medium operable to facilitate subsequent retrieval of a subset of the selected performance values for analysis.

2. The method of claim 1, wherein initiating the database performance monitoring session comprises initiating the session through an operating system scheduling module.

3. The method of claim 1, wherein initiating the data performance monitoring session comprises initiating the session from a command line.

4. The method of claim 1, wherein initiating the database performance monitoring session comprises executing a parameter driven driver script.

5. The method of claim 4, wherein the parameter driven driver script comprises a plurality of parameters comprising:
   an iterations parameter comprising a number of iterations to be performed;
   an interval parameter comprising an interval of time between each iteration.

6. The method of claim 1, wherein repeatedly obtaining selected performance data comprises:
   identifying a selected performance value to be monitored; and
   repeatedly executing a query on the database to retrieve the selected performance data stored in the database.

7. The method of claim 6, wherein executing the query comprises executing a plurality of queries in a single call.

8. The method of claim 1, wherein logging the performance data to a storage medium comprises:
   tagging each performance value with a time stamp and an identifier; and
   storing each performance value in a log file, the log file operable to facilitate retrieval of a subset of the performance data stored therein corresponding to the time stamp or the identifier.

9. The method of claim 1, wherein initiating a database performance monitoring session, obtaining selected performance data, and logging the performance data comprises:
   initiating a database performance session at a first computer;
   communicating with a second computer, the second computer comprising a storage medium containing the database;
   accessing the database to retrieve the selected performance data;
   communicating the performance data to the first computer; and
   logging the performance data to a storage medium in the first computer.

10. The method of claim 1, further comprising:
    retrieving a subset of the selected performance values having a common attribute;
    communicating the subset of performance values to an analysis tool; and
    analyzing the subset of the selected performance values.

11. A system for monitoring and logging the performance of a database, comprising:
    an initiating module operable to initiate a performance monitoring session;
    a query script operable to present a query to the database and retrieve selected performance data comprising at least one performance value comprising a measure of the performance of the database; and
    a performance log operable to receive and store the selected performance data and to facilitate retrieval of a subset of the selected performance values for analysis.

12. The system of claim 11, wherein the initiating module comprises an operating system scheduling module operable to receive a command to initiate a performance monitoring session.

13. The system of claim 11, wherein the initiating module comprises a parameter driven driver script operable to determine at least an initiating time and a duration of the session.

14. The system of claim 13, wherein the parameter driven driver script comprises a plurality of parameters, comprising:
    an iterations parameter comprising a number of iterations to be performed; and
    an interval parameter comprising an interval of time between each iteration.

15. The system of claim 11, wherein the query script comprises a structured query language script comprising at least one structured query language query operable to identify and retrieve a selected performance value.

16. The system of claim 15, wherein the structured query language script comprises a plurality of structured query language scripts operable to be executed in a single call.

17. The system of claim 11, wherein the performance log comprises a record for each performance value, each record comprising a time stamp and an identifier corresponding to the performance value stored therein, the log file operable to facilitate retrieval of a subset of the performance data stored therein corresponding to the time stamp or the identifier.

18. The system of claim 11, wherein:

the database resides on a first computer;

the initiation module, query script, and performance log reside on a second computer; and wherein the second computer communicates with the first computer over a network.

19. A database performance monitoring and logging system comprising:

a computer readable media; and a software program stored on the computer readable media and operable to:

initiate a performance data logging session;

repeatedly obtain selected performance data from a database, the selected performance data comprising at least one performance value comprising a measure of the performance of the database; and log the performance data to a storage medium operable to facilitate retrieval of a subset of the selected performance values for analysis.

20. The database performance monitoring and logging system of claim 19, wherein initiating the performance data logging session comprises initiating the session through an operating system scheduling module.

21. The database performance monitoring and logging system of claim 19, wherein initiating the performance data logging session comprises initiating the session from a command line.

22. The database performance monitoring and logging system of claim 19, wherein initiating the performance data logging session comprises executing a parameter driven driver script.

23. The database performance monitoring and logging system of claim 22, wherein the parameter driven driver script comprises a plurality of parameters comprising:

an iterations parameter comprising a number of iterations to be performed;

an interval parameter comprising an interval of time between each iteration.

24. The database performance monitoring and logging system of claim 19, wherein repeatedly obtaining selected performance data comprises:

identifying a selected performance value to be monitored; and repeatedly executing a query on the database to retrieve the selected performance data stored in the database.

25. The database performance monitoring and logging system of claim 24, wherein executing the query comprises executing a plurality of queries in a single call.

26. The database performance monitoring and logging system of claim 19, wherein logging the performance data to a storage medium comprises:

tagging each performance value with a time stamp and an identifier; and storing each performance value in a log file, the log file operable to facilitate retrieval of a subset of the performance data stored therein corresponding to the time stamp or the identifier.

27. The database performance monitoring and logging system of claim 19, wherein initiating a database performance monitoring session, obtaining selected performance data, and logging the performance data comprises:

initiating a database performance session at a first computer;

communicating with a second computer, the second computer comprising a storage medium containing the database;

accessing the database to retrieve the selected performance data;

communicating the performance data to the first computer; and logging the performance data to a storage medium in the first computer.

28. The database performance monitoring and logging system of claim 19, further comprising:

retrieving a subset of the selected performance values having a common attribute;

communicating the subset of performance values to an analysis tool; and analyzing the subset of the selected performance values.

* * * * *